United States Patent

Brink

[15] 3,657,570

[45] Apr. 18, 1972

[54] RATIOLESS FLIP-FLOP

[72] Inventor: Robert E. Brink, Deer Park, Tex.

[73] Assignee: Shell Oil Company, New York, N.Y.

[22] Filed: May 18, 1970

[21] Appl. No.: 38,303

[52] U.S. Cl. ....307/279, 307/251, 307/304, 307/291

[51] Int. Cl. ....H03k 3/26

[58] Field of Search ....307/205, 221 C, 251, 279, 291, 307/292, 304

[56] References Cited

UNITED STATES PATENTS

| | | | |
|---|---|---|---|
| 3,383,570 | 5/1968 | Luscher | 307/220 |
| 3,383,569 | 5/1968 | Luscher | 307/279 |
| 3,292,008 | 12/1966 | Rapp | 307/251 |
| 3,051,848 | 8/1962 | Clark | 307/291 |
| 3,275,846 | 9/1966 | Bailey | 307/292 |
| 3,363,115 | 1/1968 | Stephenson et al | 307/299 |
| 3,384,766 | 5/1968 | Kardash | 307/279 |
| 3,493,786 | 2/1970 | Ahrons et al. | 307/304 |
| 3,514,765 | 5/1970 | Christensen | 307/251 |

OTHER PUBLICATIONS

Boysel & Murphy " Multiphase Clocking Achieves" 100-N Sec. Mos Memory Electronic Design News June 10, 1968 Pages 50, 51, 52, 54 and 55

Short " Mosfet Sift Register Element" IBM Tech. Disclosure Bulletin, Vol. 9, No. 8, Jan. 1967, Pages 1,047- 1,049

*Primary Examiner*—Donald D. Forrer
*Assistant Examiner*—R. E. Hart
*Attorney*—J. H. McCarthy and T. E. Bieber

[57] ABSTRACT

A ratioless J-K mode IGFET flip-flop circuit is produced by providing a pair of NOR gates each having one input connected to a source of flipping signals and the other input cross-coupled through a clocked gate to the output of the other NOR gate. In each NOR gate, the flipping signal input may be gated from the output of the same NOR gate to permit operation of the flip-flop circuit in either the J-K mode or the common-input mode.

9 Claims, 2 Drawing Figures

INVENTOR.
ROBERT E. BRINK
BY
Mellin, Moore & Weissenberger
ATTORNEYS

RATIOLESS FLIP-FLOP

BACKGROUND OF THE INVENTION

Flip-flop circuits composed of IGFET (insulated gate field effect transistor) circuitry have been known for some time. However, prior art IGFET flip-flop circuits have generally relied either on ratioed circuits, which makes them difficult to manufacture and relatively slow in operation, or on circuits in which a balance of circuit voltages is distributed by the application of a flipping signal. This latter method tends to be cumbersome and is also relative slow and unreliable in operation.

SUMMARY OF THE INVENTION

The present invention overcomes the disadvantages of the prior art by providing a simple ratioless IGFET flip-flop circuit which does not depend on any voltage races but uses sequentially-timed switching operations. Consequently, the circuit of this invention is simple in construction and fast and reliable in operation. At the same time, all material circuit conditions are refreshed at each clock pulse so that no capacitive leakage problems are involved.

It is therefore the object of the invention to provide a simple, fast-acting ratioless IGFET circuit.

It is another object of the invention to provide a circuit of the type described which can be operated either in the J-K mode or in the common-input mode.

It is a further object of the invention to provide a circuit of the type described which utilizes a pair of ratioless NOR gates which are cross-coupled through clock-operated transfer gates to impart switching impulses to one another in sequentially-timed relationship in response to external flipping signals.

It is a further object of the invention to provide a circuit of the type described in which the flipping signal inputs are gated in accordance with the output signal condition of the NOR circuit to which they are applied, so as to make the circuit operable either in the J-K mode or in the common-input mode.

DESCRIPTION OF THE PREFERRED EMBODIMENT

Figure 1:
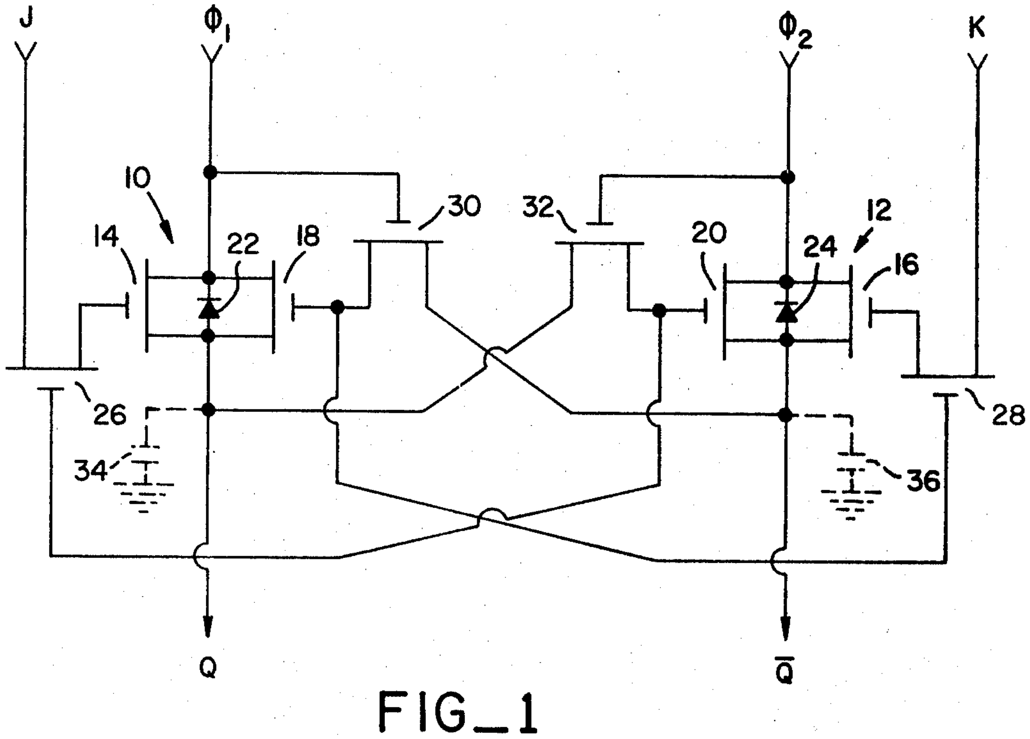
FIG. 1 is a circuit diagram of the circuit of this invention.

FIG. 1 shows the basic circuit of this invention to consist of a pair of NOR gates 10, 12 each of which is provided with an input IGFET 14, 16, a control IGFET 18, 20, and a precharge diode 22, 24. It will be understood that the precharge diodes 22, 24 may be replaced by IGFETs whose gates are connected to $\phi$ and $\phi$2, respectively, without departing from the spirit of the invention.

The flipping signal input to the input IGFET's 14, 16 may be controlled, respectively, by input gating IGFET's 26, 28. If the circuit is operated in the J-K mode with properly timed flipping signals, the input gating IGFET's 26, 28 may be dispensed with; but their presence permits the circuit to be operated either in the J-K mode or in the common-input mode.

The control IGFET's 18, 20 are cross-coupled to the outputs of NOR gates 12, 10, respectively, through clock-operated transfer gates 30, 32. The double-rail output of the circuit appears at Q and $\overline{Q}$.

The operation of the circuit is as follows: with the circuit de-energized at the start, the first $\phi$1 pulse precharges the output or line capacitance 34. With no signal on input J and hence no signal on the gate electrode of input IGFET 14, the output capacitance 34 cannot discharge following the cessation of the $\phi$1 pulse.

When the $\phi$2 pulse appears, the output on line capacitance 36 is momentarily charged through precharge diode 24. However, during the presence of the clock pulse $\phi$2, the transfer gate 32 is enabled and transfers the charged condition of output capacitance 34 to the gate electrode capacitance of control IGFET 20. Consequently, the output capacitance 36 discharges again immediately after the cessation of the clock pulse $\phi$2 through the now-enabled control IGFET 20. Consequently, it will be seen that as long as there is no input at J or K, a double-rail logic 1 output will exist at the output terminals Q and $\overline{Q}$ in the interval between clock pulses.

During the aforementioned circuit condition, it will be seen that the gate electrode of control IGFET 18 remains at ground level at all times, because the path between output capacitance 36 and the gate electrode of control IGFET 18 is blocked by transfer gate 30 during the $\phi$2 pulse.

It will be recalled that during the occurrence of the $\phi$2 pulse, some of the charge on output capacitance 34 was transferred through transfer gate 32 to the gate electrode of control IGFET 20. By the same token, if the input gating IGFETs 26, 28 are used, some of the charge on output capacitance 34 is transferred at the same moment to the gate electrode of data gate 26, thereby causing data gate 26 to be become enabled.

If an input is now applied to the terminal J, input IGFET 14 will become enabled and output capacitance 34 will discharge through input IGFET 14. If the circuit is operated in the common-input mode, the simultaneous appearance of a flipping signal at terminal K does not have any effect on the circuit because it is disconnected from input IGFET 16 by the blocked condition of the input gating IGFET 28.

At the next occurrence of the $\phi$2 pulse, transfer gate 32 is enabled and the discharged condition of output capacitance 34 is transmitted to the gate electrode capacitances of the control IGFET 20 and of input gating IGFET 26. As a result, control IGFET 20 and input gating IGFET 26 become blocked, the latter disconnecting the J input terminal from the input IGFET 14. It will be noted that any J flipping signal must end before the onset of the next $\phi$2 pulse (and conversely, any K signal before the onset of the next $\phi$1 pulse), so that the blocking of input gating IGFET 26 (or 28) does not trap an enabling charge on the gate capacitance of the gate electrode of input IGFET 14 (or 16).

The blocking of control IGFET 20 now prevents output capacitance 36 from discharging after the cessation of the $\phi$2 pulse. Consequently, the enabling of control IGFET 18 through transfer gate 30 at the next $\phi$1 pulse establishes a discharge path for output capacitance 34, and input gating IGFET 28 is simultaneously enabled n order to render input IGFET 16 capable of responding to the appearance of a signal at the input terminal K.

In this condition, the circuit will produce a logic 0 output at the double-rail terminals Q and $\overline{Q}$ in the intervals between clock pulses. Inasmuch as the circuit is now in the mirror-image condition of the first described condition, it will be readily seen that the appearance of a signal at input terminal K will reverse the process and restore the circuit to its logic 1 output condition.

It will consequently be seen that the circuit of this invention changes condition in response to the alternating appearance of signals at the J and K input terminals. Furthermore, in view of the fact that the input gating IGFETs 26 and 28 alternately disconnect the J and K input terminals from their NOR gate circuits, a single input may be provided by connecting the input terminals J and K together. If this is done, the circuit will change condition each time a signal is applied to the common input terminal, provided the common flipping signal ceases each time before the onset of the next clock pulse.

Figure 2:
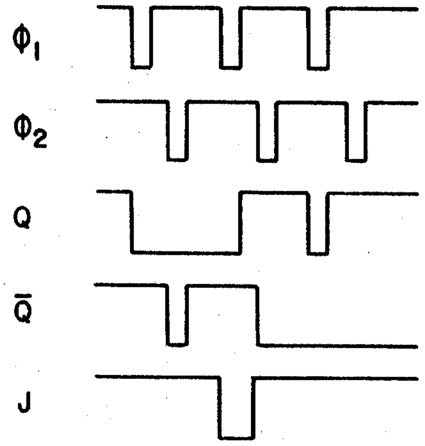
FIG. 2 is a time-amplitude diagram illustrating the pulsing sequence used in operating the circuit of FIG. 1.

FIG. 2 illustrates the Q and $\overline{Q}$ outputs produced as a result of the application of a given input to the input terminal J.

I claim:

1. A flip-flop circuit, comprising:

a. a pair of separate out-of-phase clock pulse sources;

b. a pair of flipping signal input terminals, c. a pair of NOR gate circuits each including a precharge element, a MOSFET input element and a MOSFET control element, each said precharge element being connected to a different one of said clock pulse sources, each said input element being connected to one of said flipping signal input terminals, and each said control element being connected to the output of the other NOR gate circuit; and d. transfer gate means including MOSFET devices, enabled by said separate out-of-phase clock pulse sources, arranged to gate 2. The circuit of claim 1, further comprising input gating means arranged to gate the interconnections between said flipping signal input terminals and said input elements.

3. The circuit of claim 2, in which said transfer gating means are enabled simultaneously with said control elements.

4. The circuit of claim 2, in which said flipping signal input terminals are connected together.

5. A ratioless IGFET flip-flop circuit, comprising:

a. a pair of separate out-of-phase clock pulse outputs arranged to alternately produce clock pulses spaced from one another;

b. a pair of flipping signal input terminals;

c. a pair of NOR gate circuits whose outputs constitute the double-rail output of the flip-flop circuit during the interval between clock pulses, each NOR gate circuit including i. a precharge element connected to one of said clock pulse sources; and ii. an input IGFET and a control IGFET having their drain and source electrodes connected together, the gate electrode of said input IGFET being connected to one of said flipping signal input terminals, and the gate electrode of said control IGFET being connected to the output of the other NOR gate circuit; and d. a pair of transfer gate IGFETs having their source-drain circuit connected, respectively, in series in the interconnections between said control IGFET gate electrodes and said NOR gate circuit outputs.

6. The circuit of claim 5, in which the gate electrodes of said transfer gate IGFETs are connected, respectively, to the clock pulse source associated with the NOR gate circuit to whose control IGFET gate electrode their source-drain circuits are connected.

7. The circuit of claim 5, further comprising a pair of input gating IGFETs whose source-drain circuits are connected, respectively, in series in the interconnections between said flipping signal input terminals and said input IGFET gate electrodes.

8. The circuit of claim 7, in which each gate electrode of said input gating IGFETs is connected to the gate electrode of the control IGFET of the opposite NOR gate circuit.

9. The circuit of claim 7, in which said flipping signal input terminals are connected together to form a single flipping signal input.

* * * * *